United States Patent [19]
Harvey et al.

[11] Patent Number: 5,461,472
[45] Date of Patent: Oct. 24, 1995

[54] METHOD AND APPARATUS FOR MEASURING THE PARALLELISM OF TWO SURFACES

[75] Inventors: George T. Harvey, Princeton, N.J.; Joseph S. Kovalchick, Germansville, Pa.; Ralph A. Treder, Ewing, N.J.

[73] Assignee: AT&T IPM Corp., Coral Gables, Fla.

[21] Appl. No.: 82,647

[22] Filed: Jun. 28, 1993

[51] Int. Cl.⁶ .............................. G01B 11/26; G01C 1/00
[52] U.S. Cl. ........................ 356/138; 356/153; 356/363
[58] Field of Search ................................. 356/138, 399, 356/150, 153, 363

[56] References Cited

U.S. PATENT DOCUMENTS

| | | | |
|---|---|---|---|
| 4,423,957 | 1/1984 | Poole | 356/138 |
| 4,560,274 | 12/1985 | McNeely | 356/138 |
| 5,085,509 | 2/1992 | Gaffard et al. | 356/138 |
| 5,144,486 | 9/1992 | Hart | 356/138 |
| 5,210,594 | 5/1993 | Durand | 356/138 |

OTHER PUBLICATIONS

Sales Brochure, "Alignment Collimators," published by Micro-Radian Instruments, San Marcos, Calif., Jul. 1991.

Primary Examiner—Rolf Hille
Assistant Examiner—David Ostrowski
Attorney, Agent, or Firm—Robert B. Levy

[57] ABSTRACT

The parallelism of two nominally parallel surfaces is determined by placing a planar reflector (50) on one surface and a cube beam splitter (52) on the other surface. The reflector is placed to reflect light in a direction normal to the plane of the reflector. The cube beam splitter is placed to reflect part of the light striking a first face (54) back in the opposite direction. The cube beam splitter also reflects part of the incident light towards the reflector so that the reflector reflects the light back to the cube beam splitter, causing the light to exit the first cube beam splitter face. An autocollimator (10) is provided to direct a beam of light (24) into the first face (54) of the cube beam splitter (52) and to display the divergence between the first and second reflected beam portions, the divergence corresponding to the degree of non-parallelism between the two surfaces.

9 Claims, 3 Drawing Sheets

METHOD AND APPARATUS FOR MEASURING THE PARALLELISM OF TWO SURFACES

TECHNICAL FIELD

This invention relates to a technique for determining the degree of parallelism of two surfaces.

BACKGROUND OF THE INVENTION

In some manufacturing operations there is a need to maintain two surfaces substantially parallel to each other within a very high degree of tolerance (i.e., a few arcseconds). An example of such a process is the mounting of a small-sized semiconductor chip, such as a semiconductor laser chip, to a mounting surface, i.e., a substrate or the like. Typically the semiconductor chip, which may be on the order of 10 mils ×10 mils, is mounted such that each of a plurality of conductive members (i.e., solder bumps or the like) on the undersurface of the chip is to be brought into registration with a corresponding bonding pad on the substrate. Thereafter, a reflow operation is conducted to bond the chip to the substrate.

The planarity (i.e., parallelism) of the semiconductor chip with the substrate is critical in order to assure that each mounting pad on the chip makes aligned contact with a corresponding bonding pad on the mounting surface. Even a small degree of non-planarity between the chip and the substrate can adversely affect the reliability of the resultant electrical connection. Often, the semiconductor laser chip is relatively expensive so achieving a high degree of parallelism during assembly is critical if scrap is to be minimized and costs are to be controlled.

The planarity of the chip with the substrate is also critical for another reason. Often the chip itself is very delicate, especially when the chip is fabricated from III–V or similar compounds which are brittle and tend to have poor mechanical integrity, when compared to the mounting substrate which is often made from silicon or diamond. When the chip is relatively brittle as compared to the mounting substrate, a lack of planarity between them can cause the chip to fracture or otherwise become damaged when mounting is attempted.

The planarity of the chip with the substrate is generally controlled by the mechanism used to place the chip on the substrate. Typically, a vacuum pickup tool, having a flat pickup surface, is manipulated by a robotic arm or semi-automatic device to pick up the chip and place it on the substrate which is securely held on a flat, rigid mounting base. Usually, the orientation of the pickup tool can be adjusted to achieve planarity (within a prescribed tolerance) of the chip with the substrate. In the past, a laser interferometer has been required to measure the planarity of the pickup tool and mounting bed. Such an interferometer is costly and is difficult to operate. In addition, certain safety regulations may have to be employed when using such laser interferometers.

Thus, there is a need for a less costly and less complex method of measuring the planarity of two surfaces.

SUMMARY OF THE INVENTION

Briefly, in accordance with a preferred embodiment of the invention, there is provided a method for measuring the degree of parallelism of first and second surfaces which are nominally parallel to each other. The method is practiced by rendering the first surface reflective, such as by placing a substantially planar reflective member (i.e., a flat mirror) on the first surface. A beam of light (typically, incoherent white light) is directed at a dual-path light-reflecting member, such as a cube beam splitter, which is placed on the second surface within the path of the beam of light so that a first portion of the beam is reflected by the reflecting member in a first direction. The light-reflecting member also reflects a second portion of the incident beam towards the first surface. The mirror on the first surface reflects the second portion of the incident beam back to the light-reflecting member for reflection by the member generally along the same direction as the first reflected beam portion. When the first and second surfaces are nearly parallel to each other (within a prescribed tolerance), the first and second reflected beam portions are nearly parallel with each other (i.e., the reflected beam portions lie nearly along the same direction so as not to diverge from each other). If the first and second surfaces are not substantially parallel, then the second reflected beam portion will diverge from the first reflected beam portion. To detect the divergence of the first and second beam portions, an autocollimator is typically employed.

DETAILED DESCRIPTION

Figure 1:
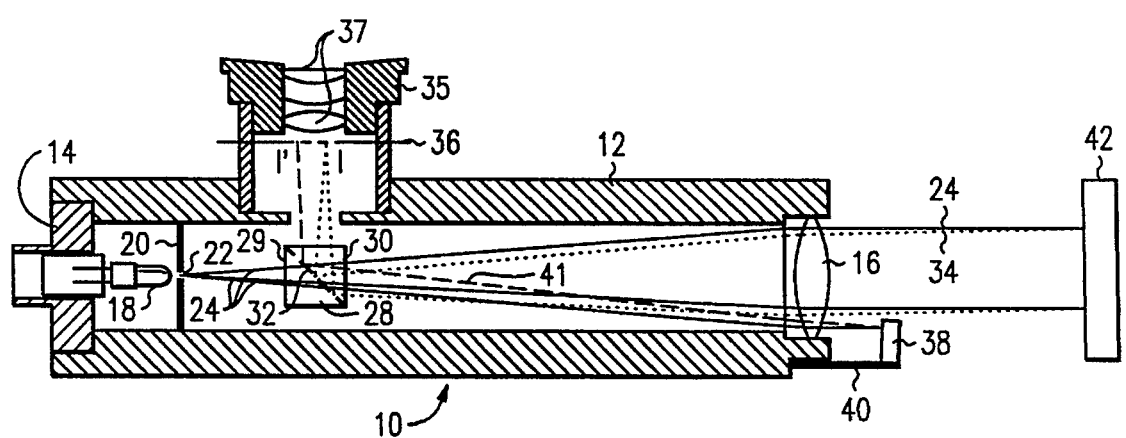
FIG. 1 is a cutaway side view of an autocollimator in accordance with the prior art.

To best understand the measurement technique of the invention, an understanding of the principle of operation of an autocollimator will prove helpful. Referring to FIG. 1, there is shown a cutaway side view of an autocollimator 10 in accordance with the prior art. The autocollimator 10 comprises a cylindrical barrel 12 having a lamp socket 14 secured in a first (left-hand) end and an objective lens 16 secured in the opposite (right-hand) barrel end. The lamp socket 14 holds a lamp 18 in a horizontal orientation such that the tip of the lamp points towards the lens 16. The lamp 18, which may be of the incandescent, halogen or mercury vapor type, is powered by a power supply (not shown) so that the lamp, when excited, emits incoherent white light.

An opaque plate 20 is situated forward (i.e., to the right) of the lamp 18. Typically, the plate 20 is shaped in the form of a disc whose diameter matches the inner diameter of the barrel 12. Centrally located in the plate 20 is a very small opening 22. When the disc 20, with its small central opening 22, is placed forward of the lamp 18, a set of light rays 24 from the lamp will appear to emanate from the opening 22, making the opening appear as a point source of light for the rays 24.

A cube beam splitter 28 is located forward of the plate 20 so as to lie between the plate and the lens 16. The cube beam splitter 28 typically takes the form of a cube made from an optically transmissive material, such as glass, having a well-controlled and uniform index of refraction. In this way, the rays 24 which enter the cube beam splitter 28 at a first face 29 thereof are refracted by the cube beam splitter so as to exit therefrom through a second face 30 opposite the first face, such that the exiting rays are parallel, but offset from the entering rays. Within the cube beam splitter 28 is a partially reflective plane 32 which is oriented at 45° so that the partially reflective plane extends from the lower edge of the first vertical face 29 of the cube beam splitter 28 to the upper edge of the second face 30.

The light rays 24 which enter the face 29 and strike the partially reflective plane 32 pass through the plane and exit the cube beam splitter so as to impinge on, and be refracted by, the lens 16. Conversely, a set of light rays 34 (shown as dashed lines) which are directed at the autocollimator 10 in a rearward (left-hand) direction so as to impinge on the lens 16 will pass through the lens and impinge on the face 30 of the cube beam splitter 28. The rays 34 impinging on the face 30 of the cube beam splitter 28 will be reflected by the partially reflective plane 32 into an eyepiece 35 extending into the barrel 12 perpendicular to its longitudinal axis so that the rays appear as a spot I on a focal plane 36. Typically, the eyepiece 35 includes one or more lenses 37 to enable an operator looking through the eyepiece to better observe the spot I made in the focal plane 36 by the rays 34.

Although not necessary to its operation, for the purposes of this invention, the autocollimator 10 of FIG. 1 is often provided with a small reference reflector 38 (i.e., a mirror) which is mounted by a support 40 at the forward (right-hand) end of the barrel 12 so that a portion of the reference reflector rises vertically above the bottom of the lens 16. In this way, the reference reflector 38 reflects a portion of the light rays 24 exiting the lens 16. The light rays reflected by the reference reflector 38 are indicated by a dash-dotted line and are identified by the reference numeral 41. The reflected rays 41 impinge on the lens 16 and pass therethrough to the cube beam splitter 28 so as to be reflected by the partially reflective plane 32 into the eyepiece 35 and appear as a spot I' on the focal plane 36.

The operation of the autocollimator 10 of FIG. 1 can best be understood by considering the effect obtained by placing a mirror 42 (not part of the autocollimator itself) a distance to the right of the lens 16. As described above, when the lamp 18 within the autocollimator 10 is energized, the light rays 24 emanate from the opening 22 in the plate 20 and pass into the cube beam splitter 28. The rays 24 pass through the cube beam splitter 28 and are then refracted by the lens 16 so that the rays exiting the autocollimator 10 are substantially parallel to each other. In other words, the rays 24 exiting the autocollimator neither converge nor diverge from each other.

The rays 24 exiting the collimator 10 strike the mirror 42 and are reflected back, appearing as the rays 34. The reflected rays 34 impinge on the lens 16 and pass therethrough onto the cube beam splitter 28 so as to be reflected by the partially reflective plane 30 into the eyepiece 35. When the mirror 42 and the reference reflector 28 are not truly parallel to each other, the spot I, representing the point at which the reflected rays 34 appear on the focal plane 36, will not be coincident with the spot I' at which the reflected rays 41 appear. Unless the mirror 42 and the reference reflector 38 are substantially parallel to each other, the spots I and I' do not coincide. As may now be appreciated, the autocollimator 10 is a highly useful device to determine the angle (i.e., the degree of divergence) between two collimated light beams.

Figure 2:
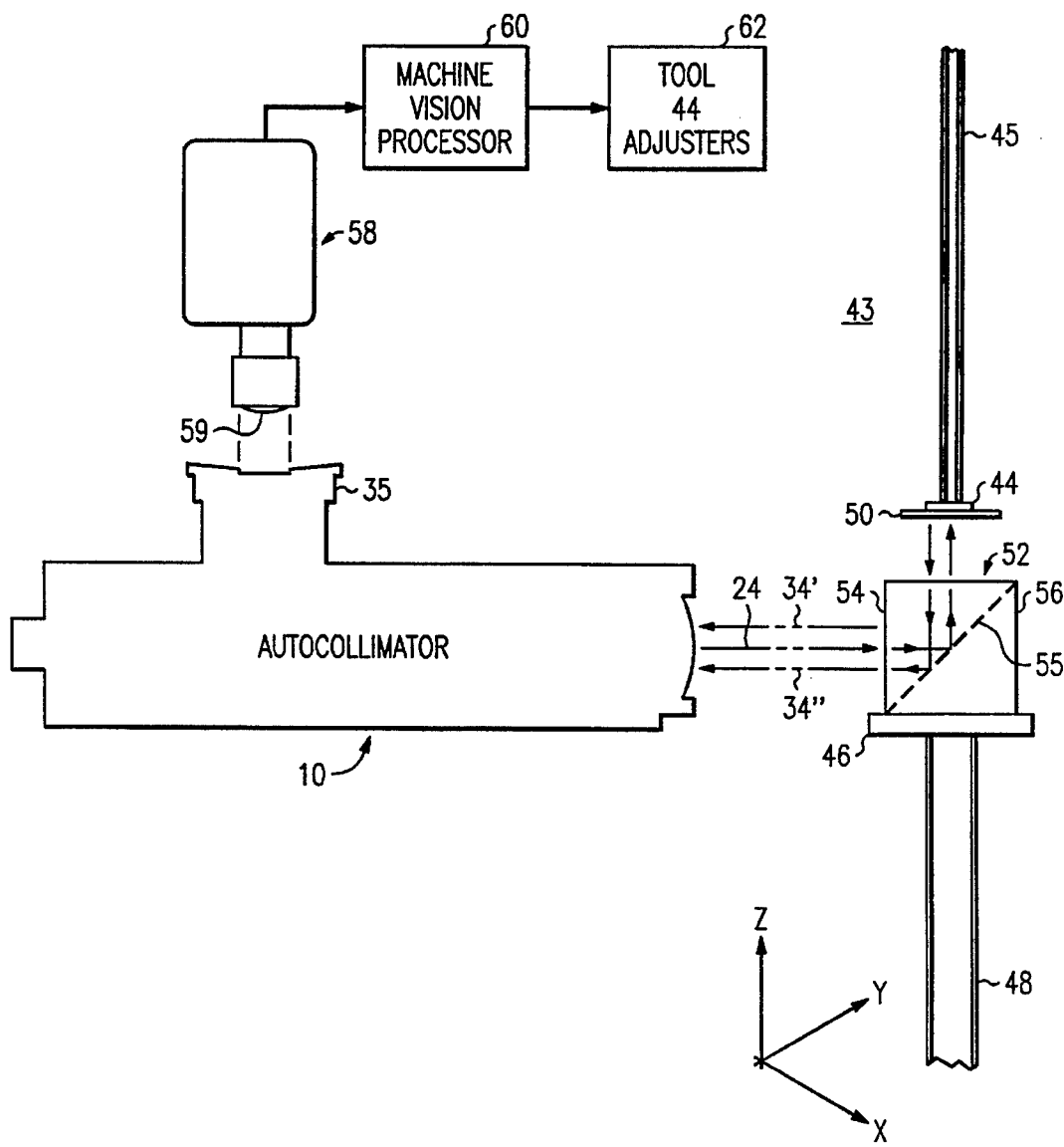
FIG. 2 is a side view of an apparatus, including the autocollimator of FIG. 1, for measuring the degree of parallelism of a first surface relative to a second surface in accordance with the invention.

Referring now to FIG. 2, the autocollimator 10 (less the reference reflector 38 of FIG. 1 ) may be advantageously used, in accordance with an apparatus 43, to determine the degree of parallelism of two surfaces in accordance with the invention, such as a lower surface on a pickup head 44 carried by a pickup tool 45, and an upper surface on a bed 46 of a bonding station 48. To measure the degree of parallelism between the bottom surface of the pickup head 44 and the upper surface of the bed 46, the apparatus 43 includes a mirror 50, having a very high degree of parallelism between its front and rear faces, which is engaged by the pickup head on the tool 44 such that the mirror has its reflective surface opposite the upper surface of the bed 46. Note that in some instances the bottom surface of the pickup head 44 is reflective, or can be made reflective, which, as will be appreciated, may obviate the need for the mirror 50.

In addition to engaging a mirror 50 with pickup head 44 in the manner described, a cube beam splitter 52 is placed on the bed 46 so as to be spaced below the mirror. Like the cube beam splitter 28 of FIG. 1, the cube beam splitter 52 of FIG. 2 is formed of a cube of optically transmissive material, such as glass or the like, having a uniform index of refraction. The cube beam splitter 52 is placed on the bed such that the cube beam splitter has a first vertical face 54 opposite to, and substantially parallel with, the lens 16 (see FIG. 1) of the autocollimator 10 along both a vertical (z) axis and along a first (y) horizontal axis. In this way, the rays 24 emanating from the autocollimator 10 are reflected by the first cube beam splitter face 54 as a set of parallel rays 34'.

Like the cube beam splitter 28 of FIG. 1, the cube beam splitter 52 of FIG. 2 contains a reflective plane 55 oriented at a 45° angle so as to extend from the lower corner of the first face 54 of the cube beam splitter to the upper corner of a second face 56 directly opposite the first face. The portion of the rays 24 which enter the cube beam splitter 52 from the autocollimator 10 and strike the reflective plane 55 will be reflected by the plane vertically upward so as to strike the mirror 50. The rays 24 striking the mirror 50 are reflected by the mirror back as rays 34" which are directed into the cube beam splitter 52 so as to strike the reflective plane 55. The rays 34" striking the reflective plane 55 from the mirror 50 will be reflected by the reflective plate back through the cube beam splitter 52 so as to exit the cube beam splitter face 54.

When the lower surface of the pickup head 44 is nearly perfectly parallel with the upper surface on the bed 46, then the mirror 50 will be nearly perfectly perpendicular to the face 54 of the cube beam splitter 52. Under these conditions, the rays 34', reflected by the face 54 of the cube beam splitter 52, will be nearly perfectly parallel with, so as not to diverge from, the rays 34" reflected by the mirror 50 back through the cube beam splitter. Thus the rays 34' and 34" entering the autocollimator 10 will pass through the lens 16 (see FIG. 1) and impinge on the partially reflective plane 32 of FIG. 1 so as to be reflected by the plane onto the same spot on the focal plane 36 of FIG. 1.

Referring to FIG. 2, if the mirror 50 is not nearly perpendicular to the face 54 on the cube beam splitter 52, as a consequence of the lower surface on the pickup head 44 not being nearly parallel to the upper surface on the bed 46, then the rays 34' and 34" will not be parallel to each other. Rather, the rays 34" reflected by the mirror 50 will diverge from the rays 34' reflected by the cube beam splitter face 54. As a consequence, the rays 34' and 34" will each be focused by the lens 16 (see FIG. 1) of the autocollimator 10 at different spots on the focal plane 36 of FIG. 1. Thus, by observing through the eyepiece 35 of the autocollimator 10, an operator can observe whether or not the rays 34' and 34" are parallel so as to determine whether the lower surface on the pickup head 44 is nearly parallel with the upper surface of the bed 46.

It should be understood that it is not necessary for the rays 34' and 34" to be reflected into the collimator 10 nearly parallel with the incident collimator rays 24. All that is necessary is for the rays 34' and 34" to be reflected back towards the collimator 10 within its field of view. Further, while it is generally useful for the incident beam 24 to be directed at the cube beam splitter 52 nearly perpendicular to its face 54, some degree of non-perpendicularity may be tolerated. What is necessary is for the reflected beam 34" to lie in nearly the same direction as the beam 34' when the surfaces 10 and 12 are nearly parallel with each other.

Referring to FIG. 2, the process of determining whether the beams 34' and 34" are parallel with each other can be automated, rather than require an operator to make such a determination. A television camera 58, as is well known in the art, would be mounted to the autocollimator 10 such that the camera has its lens 59 coupled to the eye piece 35 to allow the camera to image the focal plane 36 of FIG. 1. As seen in FIG. 2, the output of the camera is coupled to a machine vision processor 60, a well-known special type of computer, for processing the output signal of the camera. The vision processor 60 is programmed, using standard techniques, to determine whether the reflected beams 34' and 34" appear to coincide with each other on the focal plane 36 of FIG. 1. The output of the machine vision processor 60 is coupled to an automated adjustment mechanism 62 for the tool 45, typically one or more servo-driven motors (not shown) which serves to adjust the orientation of the tool to control the planarity of the pickup head 44 relative to the bed 46 of the bonding station 48.

Figure 3:
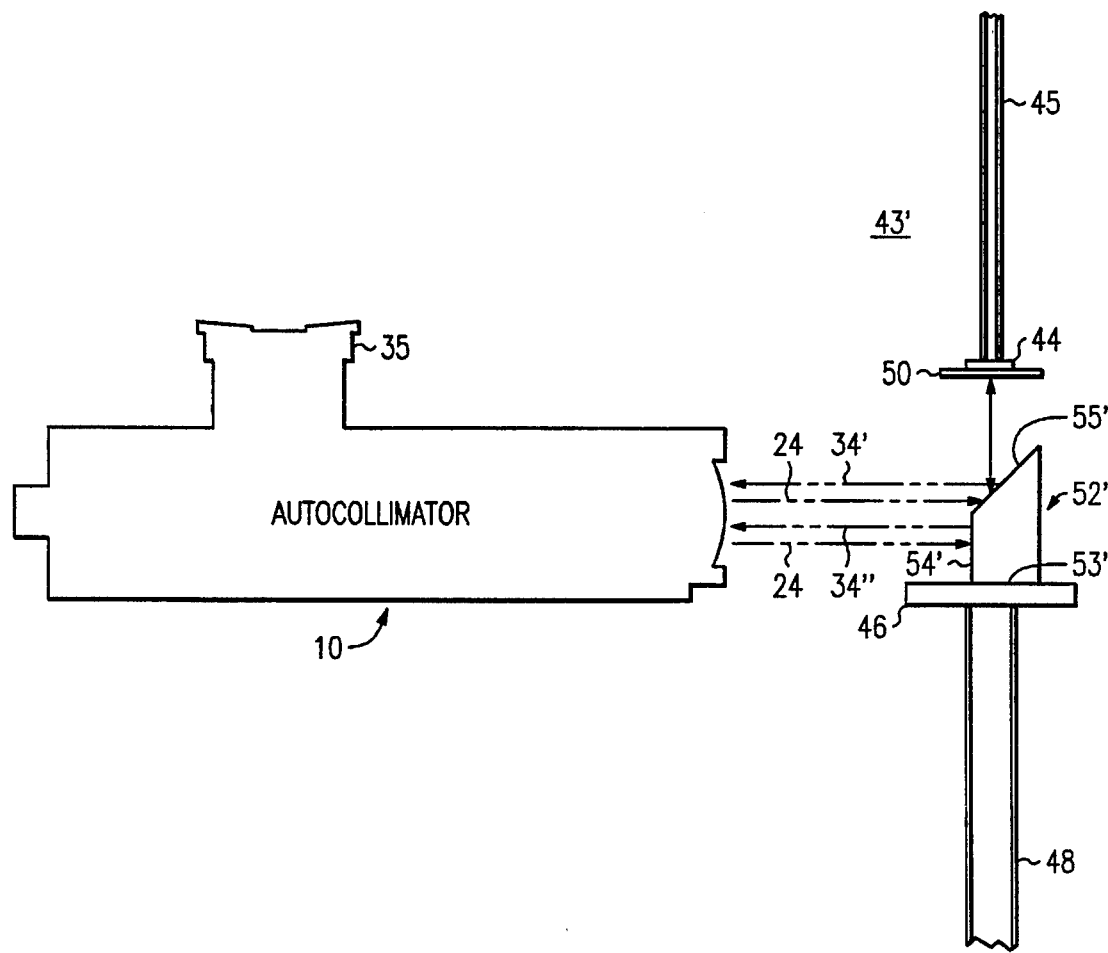
FIG. 3 is a side view of an alternate preferred embodiment of an apparatus, in accordance with the invention, for measuring the degree of parallelism of a first surface with a second surface.

Referring to FIG. 3, there is an alternate preferred apparatus 43' for measuring the parallelism between the lower surface of the pickup head 44 and the upper surface of the bed 46 of the bonding station 48. Like the apparatus 43 of FIG. 2, the apparatus 43' of FIG. 3 typically includes a mirror 50 for engagement by the lower surface of the pickup head 44 for reflecting light, directed normal to the mirror, in the opposite direction so as to be parallel to the incident beam.

The apparatus 43' does differ from the apparatus 43 of FIG. 2 in the following respect. Rather than employ the cube beam splitter 52 (see FIG. 2), the apparatus 43' of FIG. 3 employs a reflecting member 52' which typically takes the form of a metal block having a bottom face 53', a reflective first front face 54', oriented precisely perpendicular to the bottom face, and a second, reflective front face 55' sloping upwardly at a precise 45° angle from the upper edge of the first front face.

To measure the degree of parallelism of the lower surface on the pickup head 44 with the upper surface on the bed 46 with the apparatus 43', the reflecting member 52' is placed so that its bottom surface 53' rests on the bed 46. The reflecting member 52 is then oriented with its front surfaces 54' and 55' directly opposite to the forward end of the collimator 10 so that the rays 24 emanating from the collimator strike the surface 54' and are reflected as back as rays 34' into the field of view of the collimator.

The rays 24 emanating from the collimator, while collimated, nevertheless have a sufficient breadth or cross section so as to strike both the surface 54' and the surface 55' of the reflecting member 52'. The collimator rays 24 that strike the reflecting surface 55' are reflected onto the mirror 50, which in turn reflects a set of rays 34" back at this reflecting surface. The reflective surface 55', in turn, reflects the rays 34" returned by the mirror 50 back to the collimator 10. Since the reflecting surface 55' is at a precise 45° angle with the reflecting surface 54', then the rays 34" will be parallel with, so as not to diverge from, the rays 34' when the lower surface of the pickup head 44 is substantially parallel with the upper surface of the bed 46. Thus, as may be appreciated, the reflecting member 52' of FIG. 3 performs a function comparable to the function of the cube beam splitter 52 of FIG. 2.

The foregoing describes a technique for determining the parallelism of first and second surfaces by reflecting a separate one of a set of rays 34' and 34" from a reflecting member associated with each surface such that when the surfaces are nearly parallel, the rays are nearly parallel (i.e., they both lie in the same direction). Thus, by determining whether the rays 34' and 34" are parallel with each other, the parallelism of the first and second surfaces can be detected.

It is to be understood that the above-described embodiments are merely illustrative of the principles of the invention. Various modifications and changes may be made thereto by those skilled in the art which will embody the principles of the invention and fall within the spirit and scope thereof.

We claim:

1. A method for determining the parallelism of first and second spaced-apart, nominally parallel surfaces, comprising the steps of:

rendering the first surface reflective;

directing an incident beam of light;

placing a reflecting member on the second surface so as to remain there and reflect a first portion of the incident beam in a first direction and reflect a second portion of the incident beam at the first surface so as to strike the first surface and be reflected onto the reflecting member for reflection thereby, nearly co-linear with the first reflected beam portion, the degree of co-linearity corresponding with the degree to which the first and second surfaces are nearly parallel to each other; and detecting the degree to which the first and second beam portions are co-linear with each other, the co-linearity corresponding to the degree of parallelism between the first and second surfaces.

2. The method according to claim 1 wherein the non-parallelism of the first and second reflected beam portions is detected by the steps of:

directing the first and second reflected beam portions into an autocollimator within which the first and second beam portions are made to appear divergent to the extent that the beam portions are non-parallel to each other;

observing, via the autocollimator, the degree of divergence between the first and second beam portions.

3. The method according to claim 1 further including the step of adjusting the orientation of a separate one of the first and second surfaces until the first and second beam portions are nearly perfectly parallel to each other.

4. The method according to claim 2 further including the steps of:

coupling a television camera to the autocollimator to electronically image the divergence of the first and second reflected beam portions; and automatically processing the output signal of the camera to determine the degree of divergence between the first and second reflected beam portions.

5. The method according to claim 4 further including the step of adjusting the orientation of a separate one of the first and second surfaces in accordance with the degree of divergence between the first and second beam portions.

6. Apparatus for determining the degree of parallelism of first and second spaced-apart, nominally parallel surfaces, comprising:

means for rendering the first surface reflective;

an autocollimator for directing a beam of light;

a reflecting member for placement on, so as to remain with, the second surface within the beam of light generated by the autocollimator for reflecting a first portion of the collimator beam along a first direction so as to be within the field of view of the collimator and reflecting a second portion of the beam at the first surface for reflection therefrom onto the reflecting member so as to be reflected by the reflecting member, nearly co-linear with the first reflected beam portion, the degree of co-linearity corresponding to the degree to which the first and second surfaces are nearly parallel;

the autocollimator receiving the first and second reflected beam portions and displaying the co-linearity, if any, therebetween.

7. The apparatus according to claim 1 further including:

a television camera for capturing the image of the divergence of the first and second reflected beam portions as displayed by the autocollimator; and a machine vision processor for processing the output of the camera to determine the degree of divergence between the first and second reflected beam portions.

8. The apparatus according to claim 6 wherein the reflecting member comprises a cube beam splitter.

9. The apparatus according to claim 6 wherein the reflecting member comprises a block having a first reflective surface positioned opposite to the autocollimator for reflecting the first beam portion, and having a second reflective surface which slopes upwardly at a precise 45° angle from the first surface for reflecting the second beam portion.

* * * * *